US010208820B2

(12) United States Patent
Morin

(10) Patent No.: US 10,208,820 B2
(45) Date of Patent: Feb. 19, 2019

(54) RAILROAD CAR BRAKE SHOE KEY

(71) Applicant: STANDARD CAR TRUCK COMPANY, Rosemont, IL (US)

(72) Inventor: Andrew J. Morin, Mokena, IL (US)

(73) Assignee: Standard Car Truck Company, Rosemont, IL (US)

(*) Notice: Subject to any disclaimer, the term of this patent is extended or adjusted under 35 U.S.C. 154(b) by 0 days.

(21) Appl. No.: 15/405,950

(22) Filed: Jan. 13, 2017

(65) Prior Publication Data
US 2017/0211642 A1 Jul. 27, 2017

Related U.S. Application Data

(60) Provisional application No. 62/287,617, filed on Jan. 27, 2016.

(51) Int. Cl.
F16D 65/06 (2006.01)
F16D 69/04 (2006.01)
F16D 65/02 (2006.01)

(52) U.S. Cl.
CPC ........ F16D 65/062 (2013.01); F16D 69/0416 (2013.01); *F16D 2065/1392* (2013.01); *F16D 2069/0433* (2013.01)

(58) Field of Classification Search
CPC ............... F16D 65/062; F16D 65/06; F16D 2069/0441; B61H 1/00
USPC .......................................... 188/243
See application file for complete search history.

(56) References Cited

U.S. PATENT DOCUMENTS

| 492,839 | A | * | 3/1893 | Sargent | F16D 65/062 188/243 |
| 613,887 | A | | 11/1898 | Sargent | |
| 737,674 | A | * | 9/1903 | Streeter | F16D 65/062 188/243 |
| 854,475 | A | | 10/1907 | Fairbanks | |
| 941,107 | A | * | 11/1909 | Smith | F16D 65/062 188/241 |
| 1,304,044 | A | * | 5/1919 | Hawkins | F16D 65/062 188/243 |
| 1,304,049 | A | * | 5/1919 | Huber | F16D 65/062 188/243 |

(Continued)

FOREIGN PATENT DOCUMENTS

| DE | 2357048 | 5/1975 |
| GB | 6324 | 6/1907 |
| GB | 849310 | 9/1960 |

OTHER PUBLICATIONS

AAR Manual of Standards and Recommended Practices Brakes and Brake Equipment, "Brake Shoe Keys: Standard S-376," Last Revised: 2003, Dated Feb. 2014 (2 pages).

(Continued)

*Primary Examiner* — Xuan Lan Nguyen
(74) *Attorney, Agent, or Firm* — Neal, Gerber & Eisenberg LLP

(57) ABSTRACT

A railroad car spring type brake shoe key for connecting a brake shoe to a brake head, wherein the brake shoe key includes a body or shank and a head integrally formed with the body or shank, and wherein the key has a reduced mass head, an alternative configuration head, a surface treatment, or two or more of these modifications that reduces the likelihood that the head will weaken and/or break off the body of the brake shoe key.

25 Claims, 15 Drawing Sheets

(56) References Cited

U.S. PATENT DOCUMENTS

| | | | |
|---|---|---|---|
| 1,435,769 A * | 11/1922 | Watkins | F16D 65/062 188/243 |
| 1,451,332 A * | 4/1923 | Erastus | F16D 65/062 188/243 |
| 1,465,975 A * | 8/1923 | Erastus | F16D 65/062 188/243 |
| 1,495,552 A * | 5/1924 | Ditmore | F16D 65/062 188/243 |
| 1,502,459 A * | 7/1924 | Campbell | F16D 65/062 188/243 |
| 1,619,767 A * | 3/1927 | Sanford | F16D 65/062 188/243 |
| 1,854,598 A * | 4/1932 | Moore | F16D 65/062 188/243 |
| 1,886,734 A | 11/1932 | Prentice | |
| 1,927,248 A * | 9/1933 | Trainer | F16D 65/062 188/243 |
| 1,965,159 A | 7/1934 | Sargent | |
| 2,013,982 A | 9/1935 | Clouser | |
| 2,031,127 A * | 2/1936 | Peycke | F16D 65/062 188/243 |
| 2,037,936 A * | 4/1936 | Simanek | F16D 65/062 188/243 |
| 2,050,384 A * | 8/1936 | Schaefer | F16D 65/062 188/243 |
| 2,051,909 A * | 8/1936 | Schaefer | F16D 65/062 188/243 |
| 2,058,952 A | 10/1936 | Cobb, Jr. | |
| 2,077,551 A * | 4/1937 | Ekholm | F16D 65/062 188/236 |
| 2,094,273 A | 9/1937 | Mack | |
| RE20,779 E * | 7/1938 | Garand | F16D 65/062 188/243 |
| 2,138,196 A | 11/1938 | Prentice | |
| 2,230,863 A | 2/1941 | Caslin | |
| 2,331,797 A | 10/1943 | Oelkers | |
| 2,858,914 A * | 11/1958 | Arrasmith | F16D 65/062 188/243 |
| 2,873,825 A | 2/1959 | Prentice | |
| 3,015,372 A | 1/1962 | Landell et al. | |
| 3,077,957 A | 2/1963 | Arrasmith | |
| 3,124,221 A | 3/1964 | Prentice | |
| 3,237,733 A | 3/1966 | Kettering et al. | |
| 4,466,513 A | 8/1984 | Dedek | |
| 5,560,453 A | 10/1996 | Conrad | |
| 5,647,460 A | 7/1997 | Shute | |
| 5,839,549 A | 11/1998 | Tack, Jr. | |
| D601,473 S | 10/2009 | Camilo-Martinez et al. | |
| 2006/0272908 A1 | 12/2006 | East et al. | |

OTHER PUBLICATIONS

AAR Manual of Standards and Recommended Practices Brakes and Brake Equipment, "Brake Head-Limiting Contour of Brake Head Face for Hanger-Type Brake Beams: Standard S-370," Last Revised: 2009, Dated Feb. 2014 (1 page).

AAR Manual of Standards and Recommended Practices Brakes and Brake Equipment, "Brake Head-Limiting Contour of Brake Head Face for Hangerless-Type Brake Beams: Standard S-371," Last Revised: 2009, Dated Feb. 2014 (1 page).

AAR Manual of Standards and Recommended Practices Brakes and Brake Equipment, "Brake Shoe, Metal, Reinforced: Standard S-430," Last Revised: 2002, Dated Feb. 2014 (2 pages).

AAR Manual of Standards and Recommended Practices Brakes and Brake Equipment, "Brake Shoe, High-Friction Composition Type-Limiting Contour: Standard S-431," Last Revised: 2005, Dated Feb. 2014 (1 page).

Standard Car Truck Company, Brake Shoes, from website: http://www.sctco.com/BrakeShoeKey.html, printed Jan. 12, 2016 (1 page).

Anchor Brake Shoe, "Product Bulletin: Brake Shoe Key Proper Installation," Jan. 2006 (1 page).

\* cited by examiner

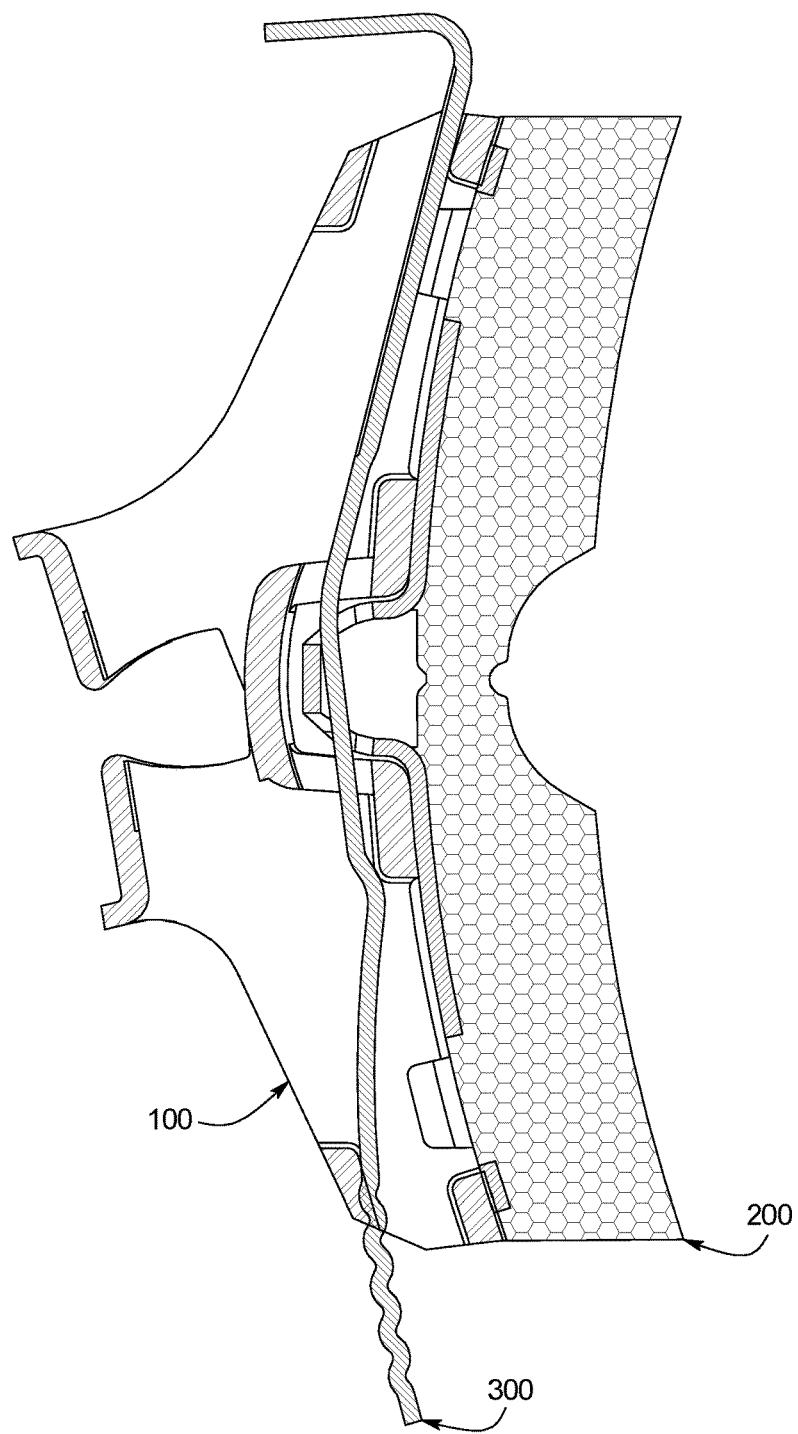

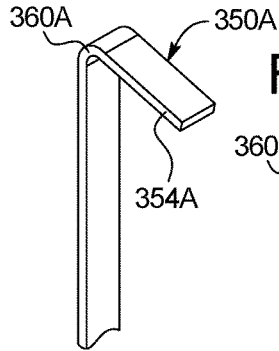
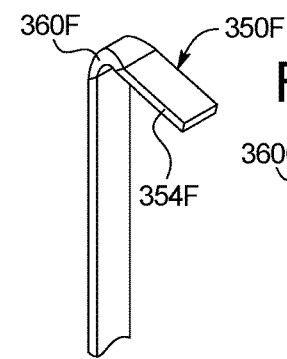
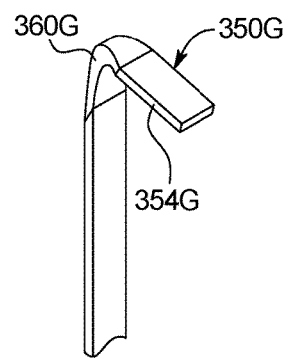
FIG. 11A PRIOR ART
FIG. 11B
FIG. 11C
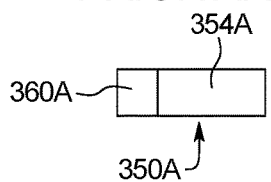
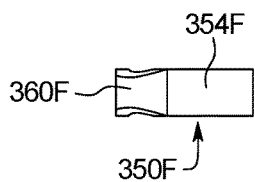
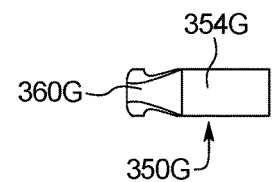
FIG. 12A PRIOR ART
FIG. 12B
FIG. 12C
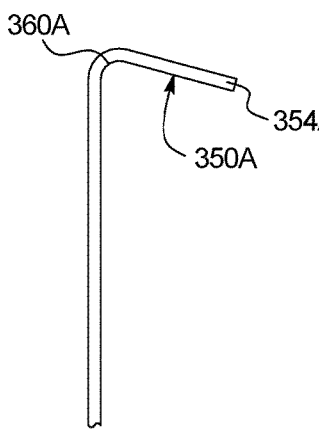
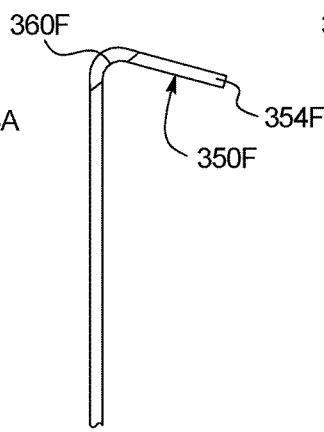
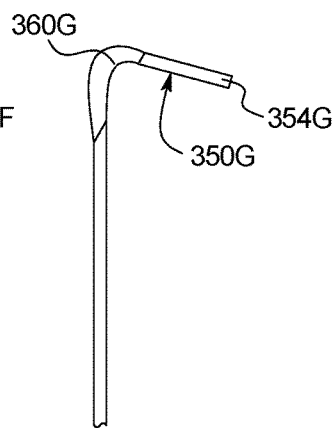
FIG. 13A PRIOR ART
FIG. 13B
FIG. 13C

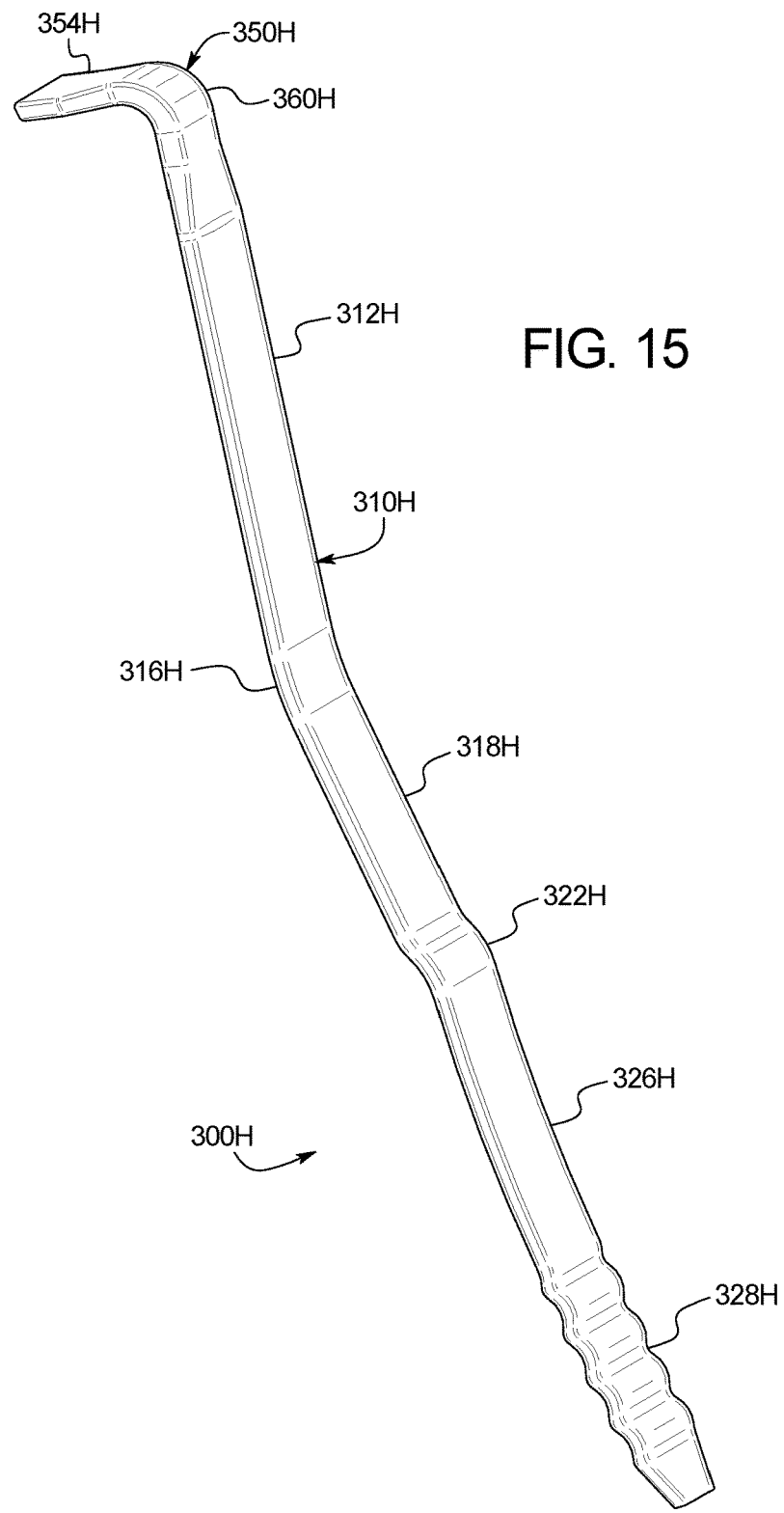

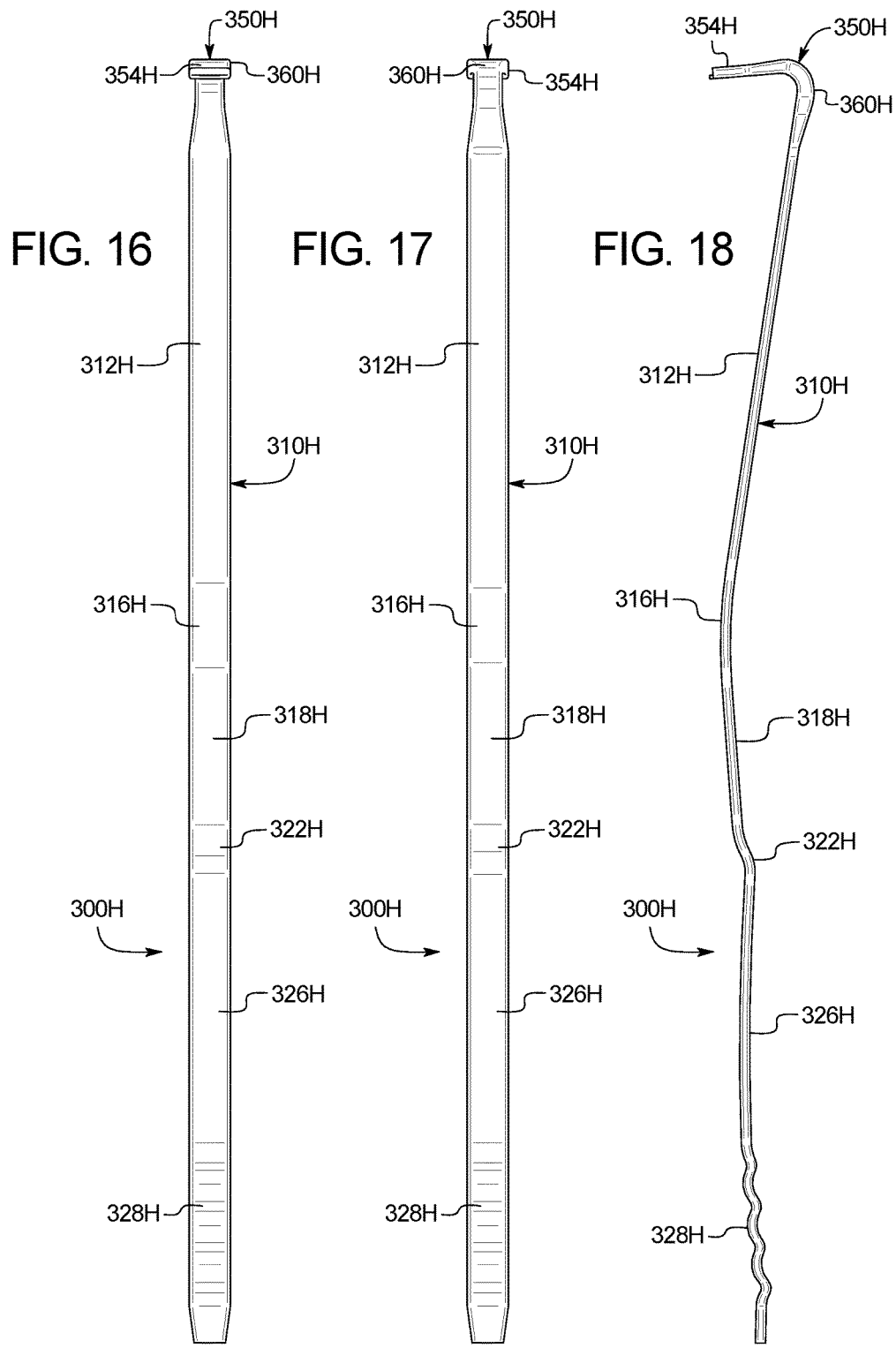

RAILROAD CAR BRAKE SHOE KEY

PRIORITY CLAIM

This patent application claims priority to and the benefit of U.S. Provisional Patent Application Ser. No. 62/287,617, filed Jan. 27, 2016, the entire contents of which are incorporated herein by reference.

BACKGROUND

Conventional freight railroad cars in North America and other parts of the world typically include a car body and two spaced apart trucks. The car body or car body under frame typically includes two spaced apart center plates that respectively rest on and are rotatably or swivelly received by bolster bowls of the two trucks. The trucks rollingly support the car body along railroad tracks or rails. Each truck typically has a three piece truck configuration that includes two spaced apart parallel side frames and a bolster. The side frames extend in the same direction as the tracks or rails, and the bolster extends transversely or laterally to the tracks or rails. The bolster extends laterally through and between and is supported by the two spaced apart side frames. Each side frame typically defines a center opening and pedestal jaw openings on each side of the center opening. Each end of each bolster is typically supported by a spring group positioned in the center opening of the side frame and supported by the lower portion of the side frame that defines the center opening. Each truck also typically includes two axles that support the side frames, four wheels, and four roller bearing assemblies respectively mounted on the ends of the axles.

Each truck further includes a brake assembly that typically includes two brake beam assemblies (i.e., one associated with each wheel and axle assembly) that are connected to brake rigging. Each brake beam assembly is supported between the truck side frames to enable such brake beam assembly to be operated into and out of braking positions in relation to the respective wheel and axle assembly. Each brake beam assembly has two spaced apart brake shoe assemblies (i.e., one associated with each wheel of the respective wheel and axle assembly). Each brake shoe assembly includes a brake head attached to the brake beam, a brake shoe, and a removable brake shoe retaining key that attaches or connects the brake shoe to the brake head. The known brake heads, brake shoes, and brake shoe retaining keys are made in accordance with Association of American Railroad ("AAR") specifications pertaining to those particular components. Brake shoes regularly wear out in service and are required to be replaced when worn to a specified extent.

Each brake shoe is detachably connected to the respective brake head by the brake shoe key. The brake shoe key is removed to enable that brake shoe to be replaced when worn or otherwise necessary. More specifically, the back of each brake shoe includes a center attaching lug that typically includes a steel strap that forms a part of the keyway into which the brake shoe key is inserted. The brake head typically includes brake head pads configured to be positioned on opposite sides of the center attaching lug of the brake shoe when the brake shoe is mounted to the brake head.

Two types of brake shoe keys have been employed in the North American railroad market. The first type of brake shoe key is the wedge type key that is formed with a decreasing taper from the head end toward the foot or leading end. The wedge type key is driven into a keyway provided by the interfitting parts of the brake head and brake shoe to attach the brake shoe to the brake head by a wedging effect. Such wedge type keys may become loosened and allow relative movement between the brake shoe and the brake head. This is more likely to occur when the wedge type key is formed from a malleable iron.

The second type of brake shoe key is the spring type key that is formed from spring steel. This type of brake shoe key is configured such that it is under tension when it connects the brake shoe to the brake head. More particularly, this spring type brake shoe key is formed from a steel strip that has a width that enables it to fit tightly into the keyway provided when the brake shoe is mounted on the brake head. The thickness of the steel strip is sufficient to provide the required sturdiness of the brake shoe key when under tension in the keyway and is no thicker than the depth of the keyway.

While these spring type brake shoe keys are reasonably effective, it has been found that the heads of certain spring type brake shoe keys tend to break off in certain circumstances. It is believed that these heads break off due to the relative vibration or movement of the brake heads relative to the relative vibration or movement of the brake shoes. It is believed that the vibration or movements of these attached parts relative to one another causes the head of the brake shoe key to undergo continuous or substantial upward and downward bending forces when the railroad car moves or rolls along the tracks or rails, and that the combination of these forces eventually leads to the weakening of the head and can eventually cause the head to break off. The weakened head of the brake shoe key can also break off when a pry bar is employed to move the brake shoe key out of its locking position by wedging the pry bar between the head of the brake shoe key and the brake head.

Several problems are caused or potentially caused when the head of a brake shoe key breaks off. One problem or potential problem is that when the head breaks off, the brake shoe can become loose relative to the brake head and move into a non-ideal position for engagement with the outer circumference of the wheel when the brakes are applied. Another problem or potential problem is that when the head breaks off, the brake shoe key can fall completely out of the keyway, which in turn causes the brake shoe to no longer be securely connected to the brake head (and possibly lost). This can also lead to the shoeless brake head contacting and potentially damaging the wheel during a brake application.

Another problem or potential problem arises for coal (or other material) carrying railroad cars that work with rotary dump systems where the railroad cars are turned upside-down to empty the coal (or other materials). In this case, gravity can cause a loose brake shoe key to become dislodged, which can cause the brake shoe key or the brake shoe to fall into the coal (or other material) deposit. This can create problems and expense for material handlers (such as coal power plant operators) in providing metal detectors to locate lost brake shoe keys or brake shoes in the coal deposit and for the removal of these brake shoe keys or brake shoes. This is especially true where these lost components represent potential damage to expensive equipment (such as coal pulverizing machinery).

Accordingly, there is a need in the railroad industry to solve these problems.

SUMMARY

Various embodiments of the present disclosure provide a new railroad car brake shoe key that minimizes or solves the above problems. More specifically, the present disclosure provides a modified spring type brake shoe key with an alternative head mass and/or configuration that reduces the likelihood that the head of the brake shoe key will weaken or break off, all without incurring any substantial increase in cost of the brake shoe key and without adversely affecting the ability of the brake shoe key to lock the brake shoe in tight relationship to the brake head.

In various embodiments, the spring type brake shoe key of the present disclosure includes a reduced mass head that reduces the likelihood that the head of the brake shoe key will weaken or break off.

In various embodiments, the spring type brake shoe key of the present disclosure includes an alternatively configured head that reduces the likelihood that the head of the brake shoe key will weaken or break off.

In various embodiments, the spring type brake shoe key of the present disclosure includes a reduced mass head and an alternatively configured head that in combination reduces the likelihood that the head of the brake shoe key will weaken or break off.

In various embodiments, the spring type brake shoe key of the present disclosure includes an altered surface property that inhibits the initiation of fatigue cracks in the head and thus reduces the likelihood that the head of the brake shoe key will break off.

In various embodiments, the altered surface property modification can be combined with one or more of the reduced mass head feature and the alternatively configured head to reduce the likelihood that the head of the brake shoe key will weaken or break off.

Other objects, features, and advantages of the present disclosure will be apparent from the following detailed disclosure, taken in conjunction with the accompanying sheets of drawings, wherein like reference numerals refer to like parts.

BRIEF DESCRIPTION OF THE FIGURES

FIG. 4 is a cross-sectional side view of the known brake head, the known brake shoe, and the known brake shoe key of FIG. 2 in an assembled position where the brake shoe key is attaching the brake shoe to the brake head.

FIG. 11A is a fragmentary top perspective view of the known brake shoe key of FIG. 2 where the corner of the head has a defined uniform configuration.

FIGS. 11B and 11C are fragmentary top perspective views of the alternative brake shoe keys of various embodiments of the present disclosure where the corners of the heads are made with a non-uniform alternative configuration.

FIG. 12A is a top view of the known brake shoe key of FIG. 2 where the corner of the head has a defined uniform configuration.

FIGS. 12B and 12C are top views of the alternative brake shoe keys of FIGS. 11B and 11C where the corners of the heads are made with an alternative non-uniform configuration.

FIG. 13A is a fragmentary side view of the known brake shoe key of FIG. 2A where the corner of the head has a defined uniform configuration.

FIGS. 13B and 13C are fragmentary side views of the alternative brake shoe keys of FIGS. 11B and 11C where the corners of the heads are made with an alternative non-uniform configuration.

FIG. 15 is a rear perspective view of the brake shoe key of FIG. 14.

FIG. 16 is a front view of the brake shoe key of FIG. 14.

FIG. 17 is a rear view of the brake shoe key of FIG. 14.

FIG. 18 is a left side view of the brake shoe key of FIG. 14.

DETAILED DESCRIPTION

Figure 1:
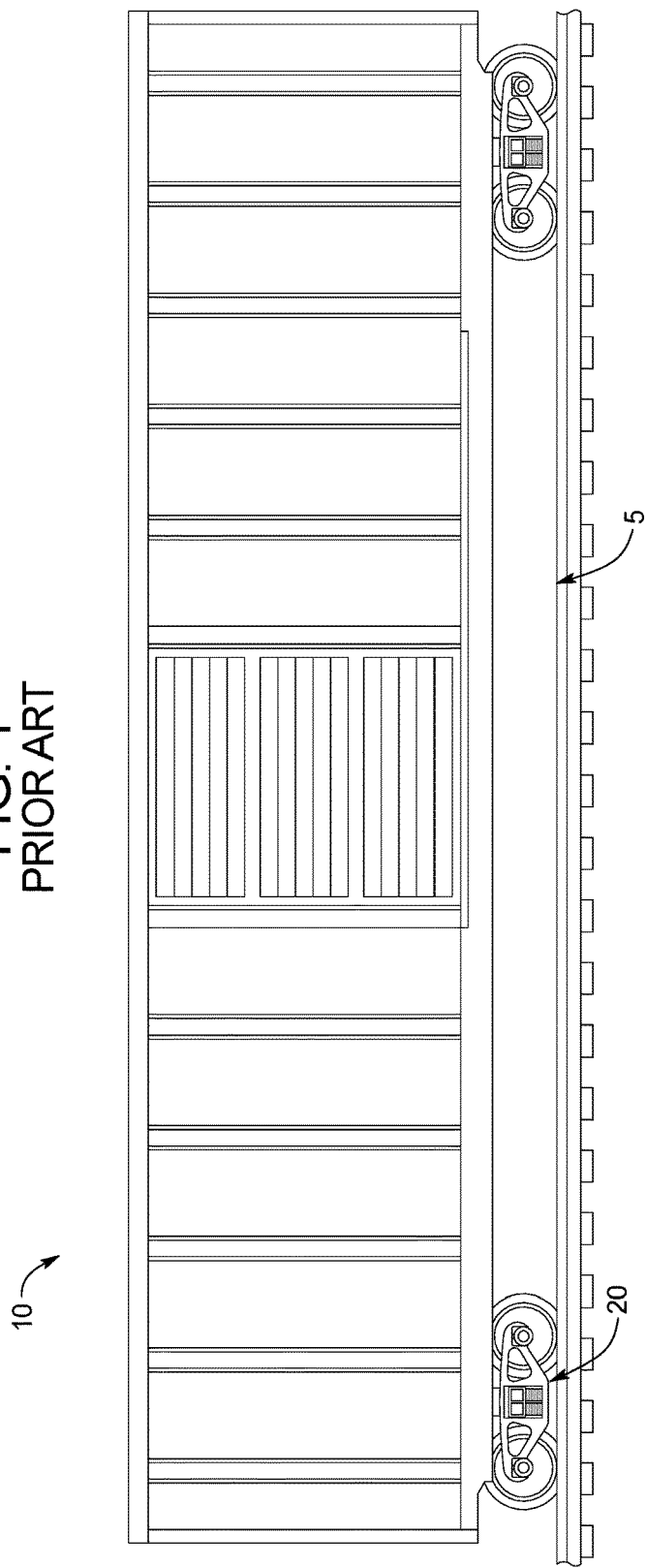
FIG. 1 is a side view of a conventional freight railroad car positioned on conventional railroad tracks or rails.

Referring now to the drawings and particularly to FIG. 1, a conventional railroad car truck 20 is illustrated with respect to a conventional freight railroad car 10 configured to roll along conventional railroad tracks or rails 5.

Figure 2:
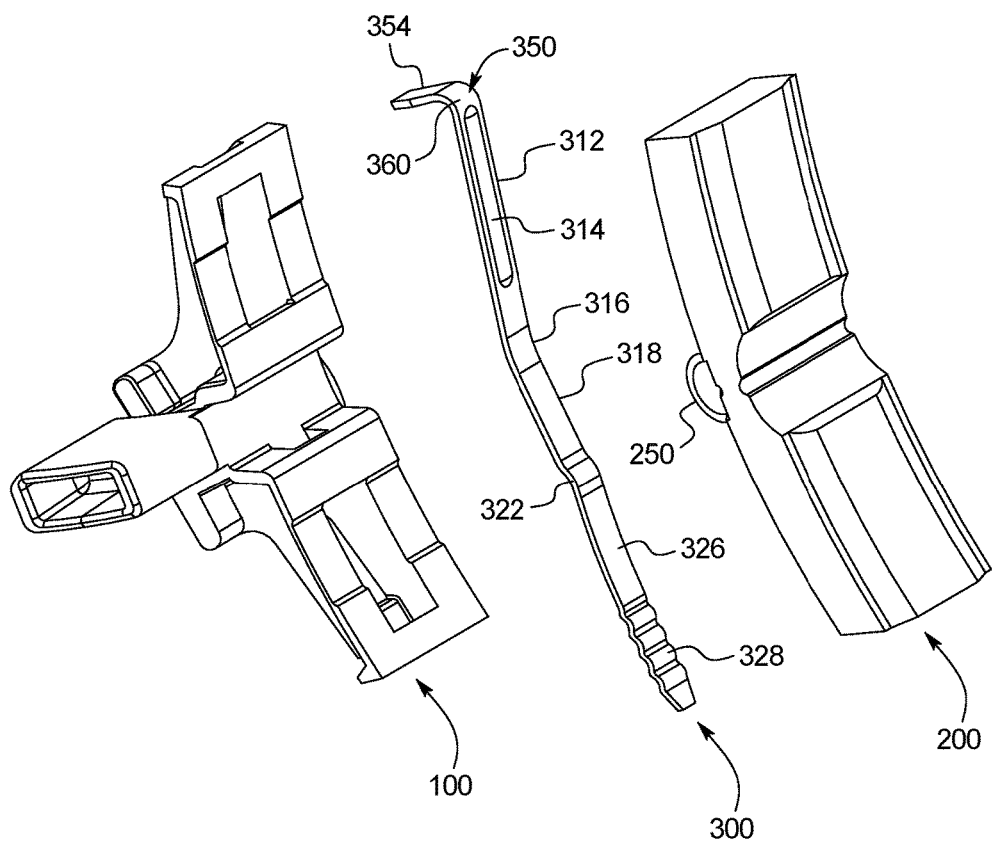
FIG. 2 is an exploded top front perspective view of a known brake head, a known brake shoe, and a known brake shoe key for a conventional freight railroad car such as the railroad car of FIG. 1.
Figure 3:
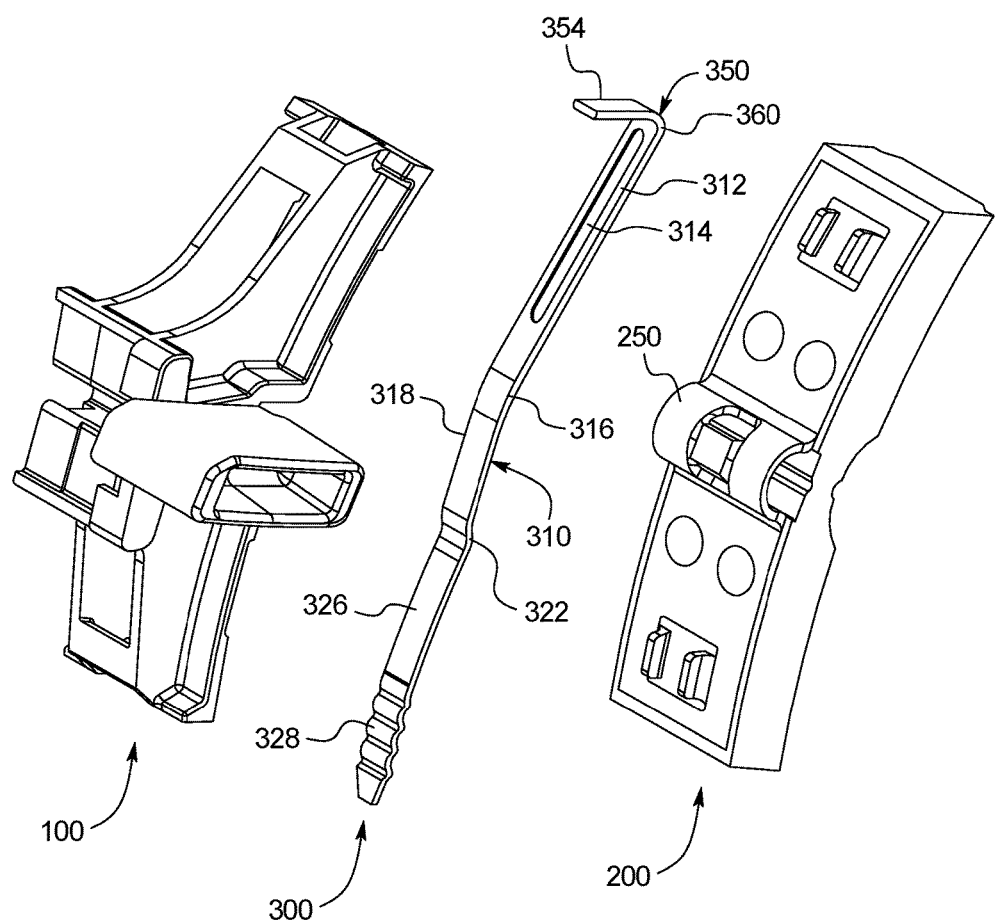
FIG. 3 is an exploded top rear perspective view of the known brake head, the known brake shoe, and the known brake shoe key of FIG. 2.

Referring now to FIGS. 2, 3, and 4, a known brake head 100, a known brake shoe 200, and a known brake shoe key 300 are generally illustrated.

This illustrated known brake shoe 200 generally includes a brake shoe pad attached to a brake shoe pad backing member or support. The brake pad shoe backing member or support includes a rearwardly extending lug that defines a keyway configured to receive the brake shoe key 300.

This illustrated known brake head 100 generally includes a body that defines a slot for receiving the rearwardly extending lug 250 of the pad backing member or support of the brake shoe 200.

This illustrated known brake shoe key 300 generally includes a body or shank 310 and a head 350 that are formed from a flat strip of spring metal having a generally arcuate, curved, or curvilinear profile.

The body or shank 310 includes a first generally straight section 312 integrally connected to the head 350 at one end. The straight section 312 is formed with a stiffening groove 314. The end of brake shoe key 300 having the head 350 is often referred to as the top of the brake shoe key. The body or shank 310 further includes a first arcuate section 316 integrally connected to the end of the straight section 312 opposite the head 350. The body or shank 310 further includes a second generally straight section 318 integrally connected to the first arcuate section 316 at one end and integrally connected to an offset notch 322 at the opposite end. The body or shank 310 further includes a second somewhat bowed or arcuate section 326 integrally connected to the notch 322 at one end and integrally connected to a tapered locking section 328 at the opposite end. The opposing faces of the tapered locking section 328 at the bottom of the body or shank 312 are formed with serrations or a series of sinuous bends that provide a plurality of end notches engageable with an adjacent end edge of the brake head when assembled. Thus, it should be appreciated that the body or shank 312 is generally curved or arched to provide a spring or biasing effect.

The head 350 of brake shoe key 300 includes a stop leg 354 that extends transversely from the body or shank 312 at an acute angle generally less than 90 degrees such as at an angle of approximately 82 degrees. The head 350 of brake shoe key 300 further includes a corner or corner section 360 that is integrally connected to the stop leg 354 and integrally connected to the first straight section 312.

As is well known in the railroad industry, and as generally illustrated in FIGS. 2, 3, and 4, this illustrated known brake shoe key 300 is configured to firmly hold the brake shoe 200 to the brake head 100 under tension of the spring load created by the brake shoe key being flexed or bent when driven into its locking position as generally shown in FIG. 4. This spring tension of the locking key 300 substantially limits the amount of play or movement between the brake head 100 and the brake shoe 200. However, as discussed above, it is believed that in certain circumstances there is still relative vibration of the brake head 200 and the brake shoe 100, and it is believed that in certain circumstances there is still relative movement of the brake head 200 to the brake shoe 100 when the brake shoe key 300 couples these components. It is also believed that this vibration and/or movement causes the head 350 of the brake shoe key 300 to undergo upward and downward bending forces, and that the combination of these forces eventually leads to the weakening of the head 350 and eventually causes the head 350 to break off in certain circumstances.

The present disclosure addresses these issues in certain embodiments by reducing the mass of the head and particularly the mass of the stop leg 354, the mass of the corner or corner section 360, or the mass of both. The mass of the head can be reduced in various different manners in accordance with the present disclosure as discussed below. By reducing the mass of the head, the force exerted on the corner or corner section 360 during such vibration or movements is reduced, and thus the weakening of the corner or corner section 360 is reduced. The reduction of mass causes a reduction of the vibrational energy that the material of the corner would otherwise be subjected too, and it is this vibrational energy that tends to weaken the corner or corner section. In other words, reducing the mass reduces the stresses to a level below the endurance limit of the material of the corner or corner section. If the corner or corner section 360 is not weakened as much, the head 350 is less likely to break off.

In other embodiments, the present disclosure addresses these issues by changing the configuration of the corner or corner section 360, thereby making the corner or corner section 360 stronger. By making the corner or corner section stronger, the force exerted on the corner or corner section 360 during such vibration or movements does not weaken the corner or corner section 360 as much, and the head 350 is less likely to break off.

In other embodiments, the present disclosure addresses these issues by reducing the mass of the head 350 and changing the configuration of the corner or corner section 360. By reducing the mass of the head 350 in combination with making the corner or corner section stronger, the force exerted on the corner or corner section 360 during such vibration or movements does not weaken the corner or corner section 360 as much, and the head 350 is less likely to break off.

In other embodiments, the present disclosure addresses these issues by altering the surface property of the entire brake shoe key or the head of the brake shoe key to inhibit the initiation of fatigue cracks in the head and thus reduce the likelihood that the head of the brake shoe key will break off.

In various embodiments, the present disclosure addresses these issues by altering the surface property and providing one or more of the reduced mass head features or alternative head configuration to reduce the likelihood that the head of the brake shoe key will weaken or break off.

More specifically, turning now to FIGS. 5A, 5B, 5C, 6A, 6B, 6C, 7A, 7B, and 7C, two examples embodiments of the present disclosure having a reduced head mass are generally illustrated in FIGS. 5B, 5C, 6B, 6C, 7B, and 7C, FIGS. 5A, 6A, and 7A illustrate a known brake shoe key where the head 350A has a defined length L that is approximately 2 inches (i.e., the distance from the end of the corner section 360A to the free end of the stop leg 354A).

Figure 5A:
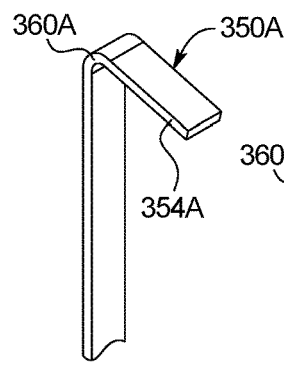
FIG. 5A is a fragmentary top perspective view of the known brake shoe key of FIG. 2 where the head has a defined length.
Figure 5B:
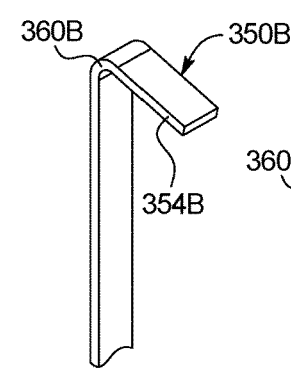
FIGS. 5B and 5C are fragmentary top perspective views of alternative brake shoe keys of various embodiments of the present disclosure where the heads are made shorter to reduce the mass of the heads.
Figure 6A:
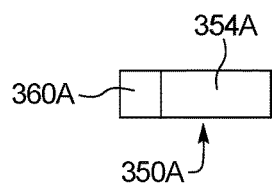
FIG. 6A is a top view of the known brake shoe key of FIG. 2 where the head has a defined length.
Figure 6B:
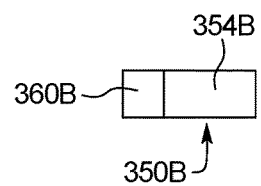
FIGS. 6B and 6C are top views of the alternative brake shoe keys of FIGS. 5B and 5C where the heads are made shorter to reduce the mass of the heads.
Figure 7A:
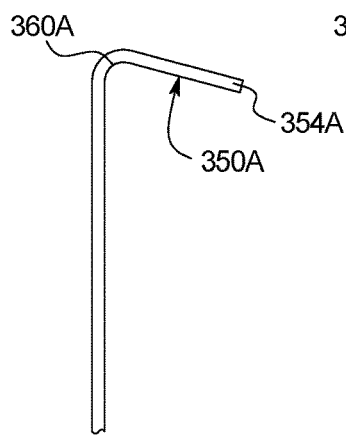
FIG. 7A is a fragmentary side view of the known brake shoe key of FIG. 2 where the head has a defined length.
Figure 7B:
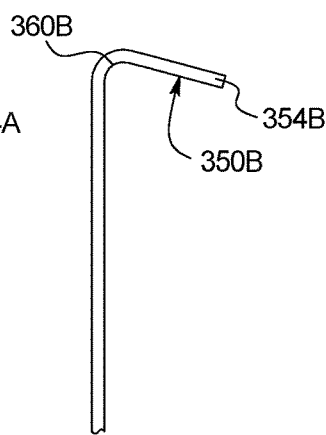
FIGS. 7B and 7C are fragmentary side views of the alternative brake shoe keys of FIGS. 5B and 5C where the heads are made shorter to reduce the mass of the heads.

FIGS. 5B, 6B, and 7B illustrate one example of the brake shoe key of the present disclosure where the head 350B has a shorter defined length L-Y that is approximately 1.75 inches (i.e., a shorter distance from the end of the corner section 360B to the free end of the stop leg 354B), but the same width and height as head 350A. By making the stop leg 354B shorter, the stop leg 354B and thus the head 350B have less mass and are thus subject to less weakening.

Figure 5C:
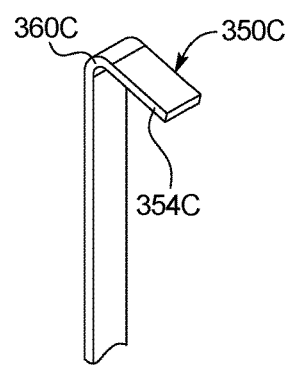
Figure 6C:
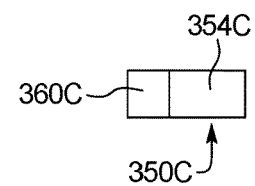
Figure 7C:
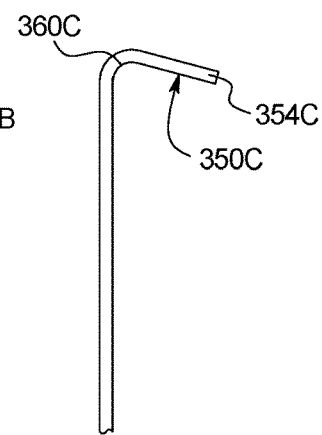

FIGS. 5C, 6C, and 7C illustrate another example of the brake shoe key of the present disclosure where the head 350C has an even shorter defined length L-Z that is approximately 1.5 inches (i.e., an even shorter distance from the end of the corner section 360C to the free end of the stop leg 354C), but the same width and height as head 350A. By making the stop leg 354C even shorter, the stop leg 354C and thus the head 350B have even less mass and are thus subject to even less weakening.

It should be appreciated that the mass reduction of the head provided by the present disclosure can be accomplished in many different forms or manners and that the examples provided herein are not meant to be limiting.

Turning now to FIGS. 8A, 8B, 8C, 9A, 9B, 9C, 10A, 10B, and 10C, two further example embodiments of the present disclosure having a reduced head mass are generally illustrated in FIGS. 8B, 8C, 9B, 9C, 10B, and 10C.

Figure 8A:
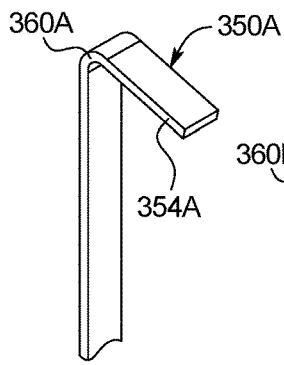
FIG. 8A is a fragmentary top perspective view of the known brake shoe key of FIG. 2 where the head has a defined width.
Figure 9A:
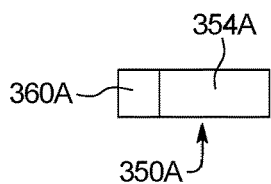
FIG. 9A is a top view of the known brake shoe key of FIG. 2 where the head has a defined width.
Figure 10A:
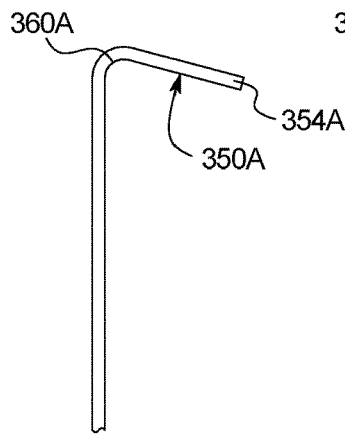
FIG. 10A is a fragmentary side view of the known brake shoe key of FIG. 2 where the head has a defined width.

FIGS. 8A, 9A, and 10A illustrate a known brake shoe key where the head 350A has a defined width W that is approximately ¾ inches (i.e., the distance from one side of the stop leg 354A to the other side of the stop leg 354A).

Figure 8B:
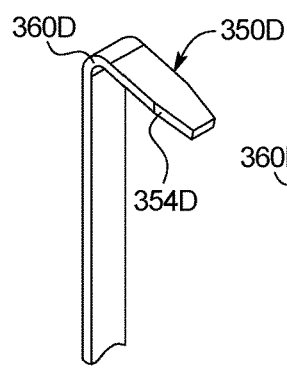
FIGS. 8B and 8C are fragmentary top perspective views of the alternative brake shoe keys of various embodiments of the present disclosure where the heads are made narrower or with a taper to reduce the mass of the heads.
Figure 9B:
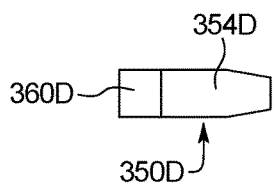
FIGS. 9B and 9C are top views of the alternative brake shoe keys of FIGS. 8B and 8C where the heads are made narrower or with a taper to reduce the mass of the heads.
Figure 10B:
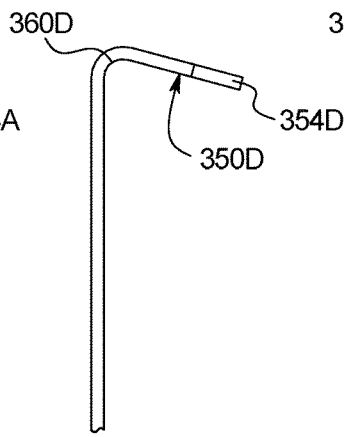
FIGS. 10B and 10C are fragmentary side views of the alternative brake shoe keys of FIGS. 8B and 8C where the heads are made narrower or with a taper to reduce the mass of the heads.

FIGS. 8B, 9B, and 10B illustrate one example of the brake shoe key of the present disclosure where the head 350D has a partial tapered width that has a first width W-YA that is approximately ¾ inches and tapers to a second narrower width W-YZ that is approximately ½ inch, but the same length and height as head 350A. By making the stop leg 354D partially tapered, the stop leg 354D and thus the head 350D have less mass and are thus subject to less weakening.

Figure 8C:
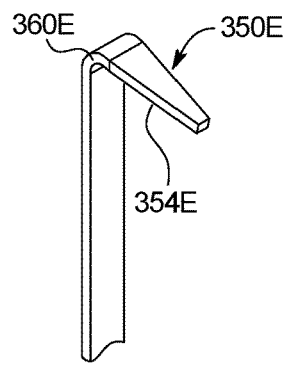
Figure 9C:
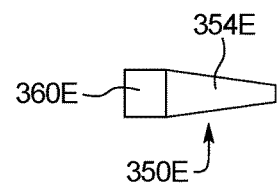
Figure 10C:
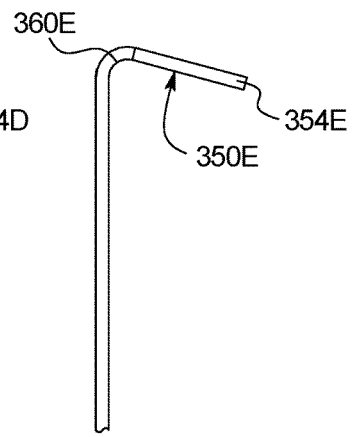
Figure 14:
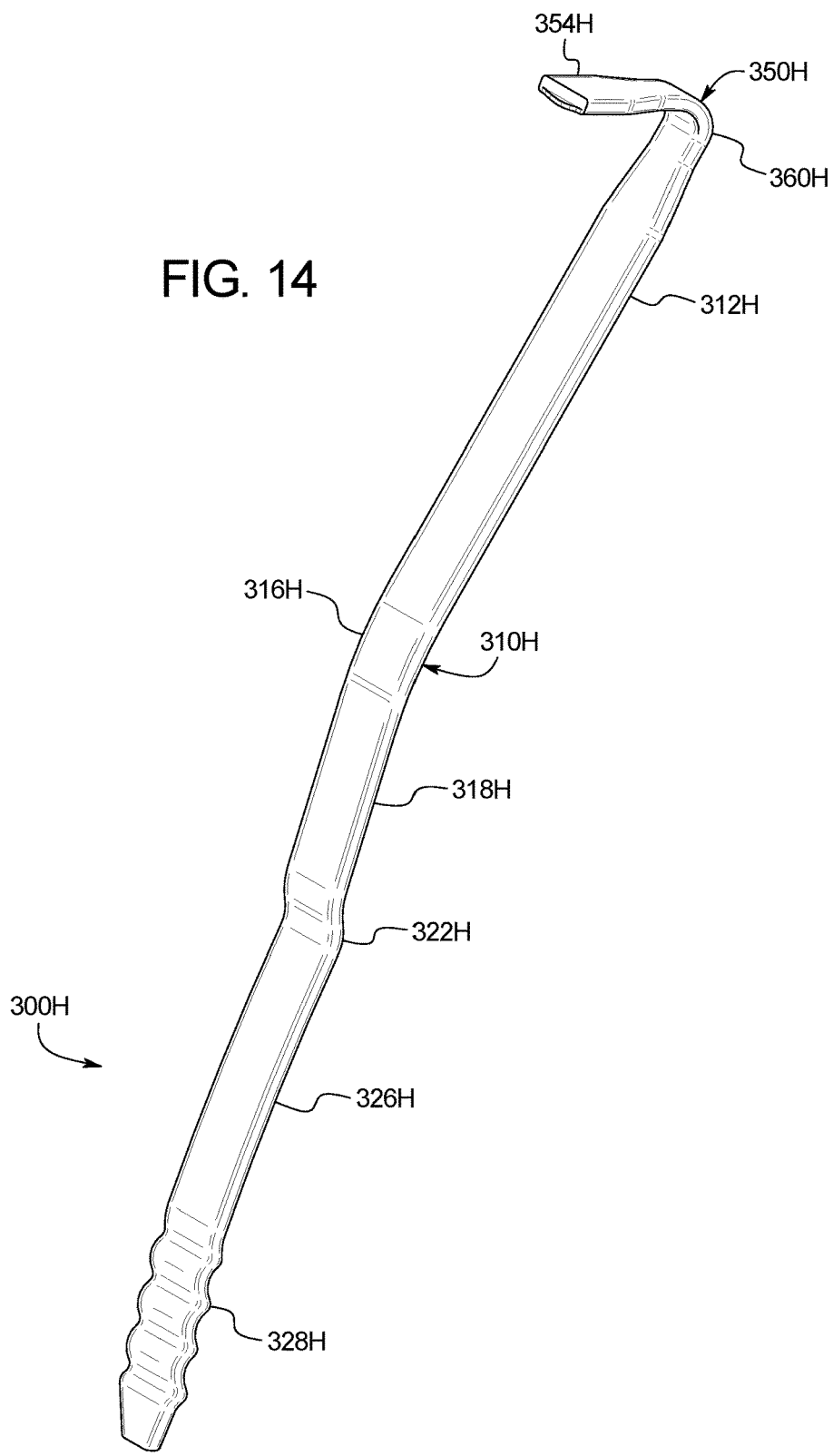
FIG. 14 is a front perspective view of a further alternative railroad car brake shoe key of the present disclosure where the corner or corner section of the head is made with an alternative non-uniform configuration.
Figure 19:
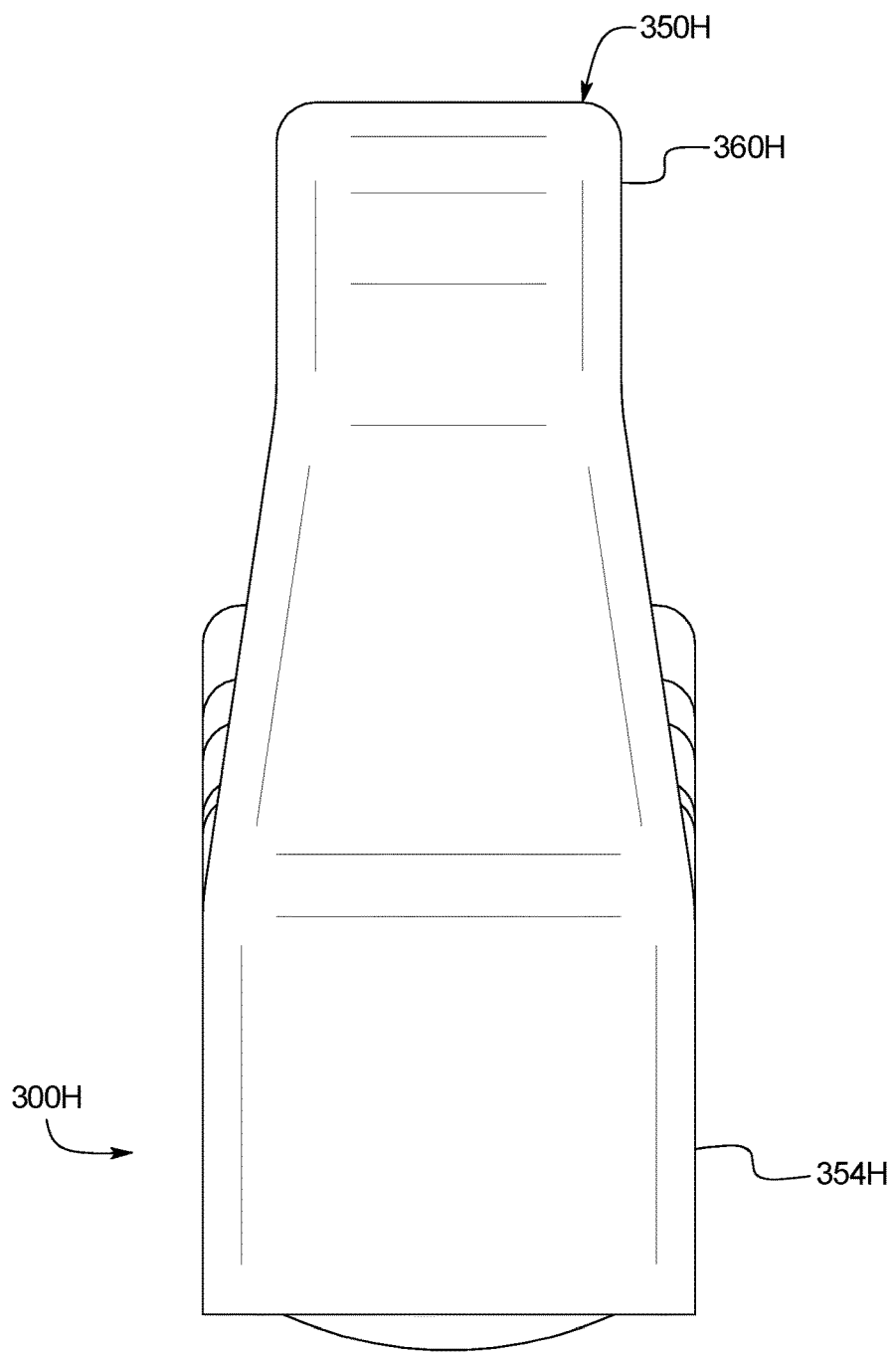
FIG. 19 is an enlarged top view of the brake shoe key of FIG. 14.
Figure 20:
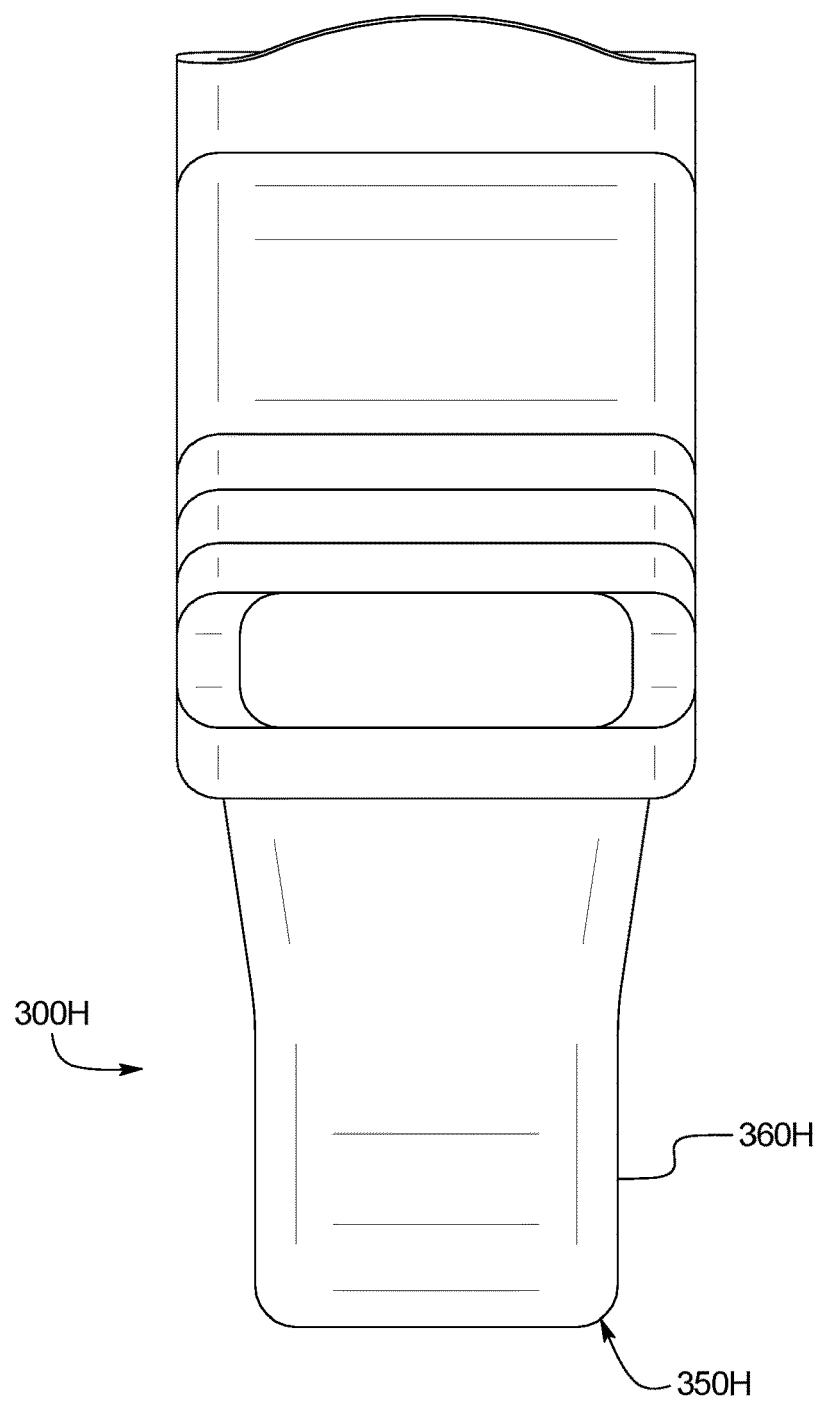
FIG. 20 is an enlarged bottom view of the brake shoe key of FIG. 14.
Figure 21:
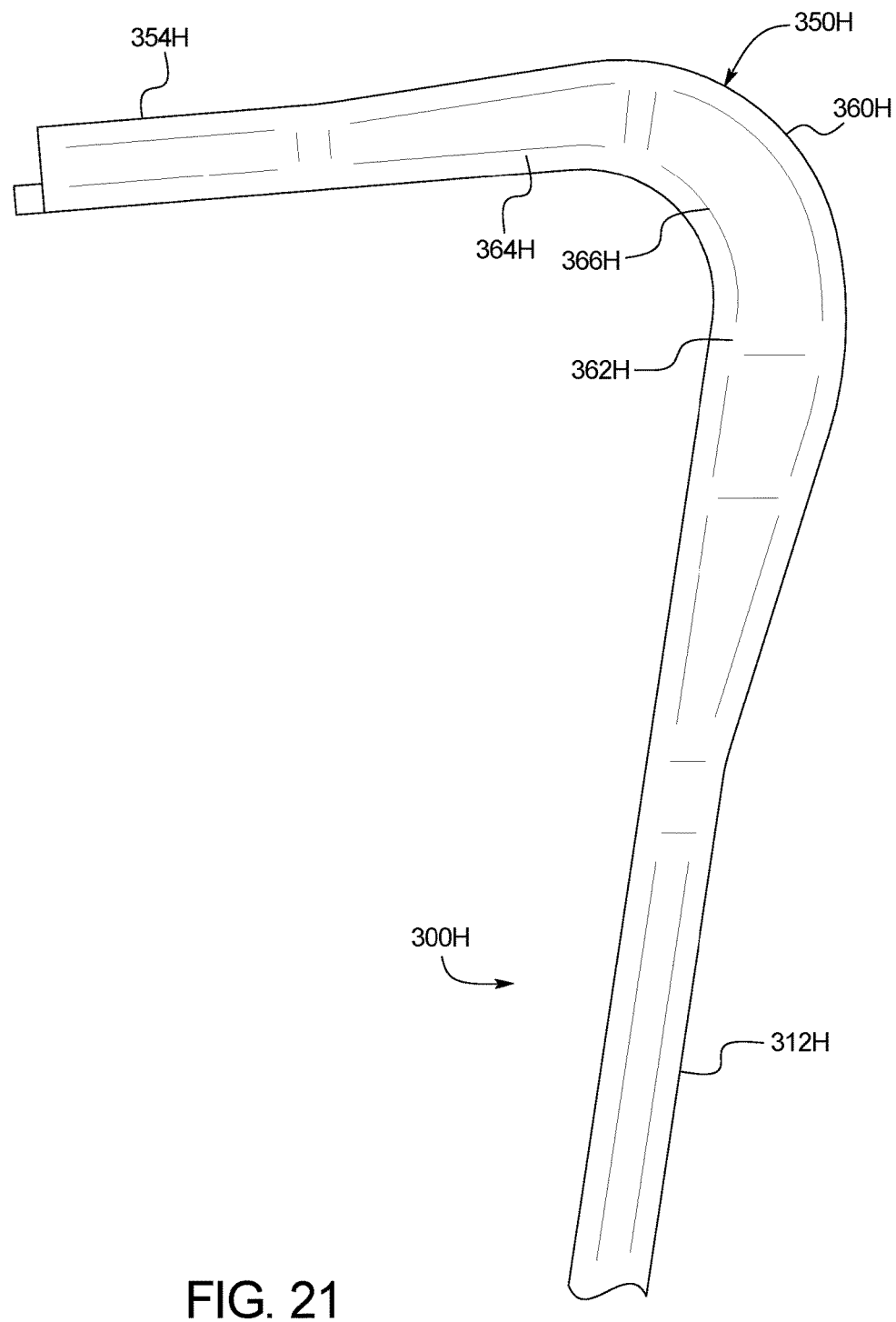
FIG. 21 is an enlarged fragmentary left side view of an upper portion of the brake shoe key of FIG. 14.
Figure 22:
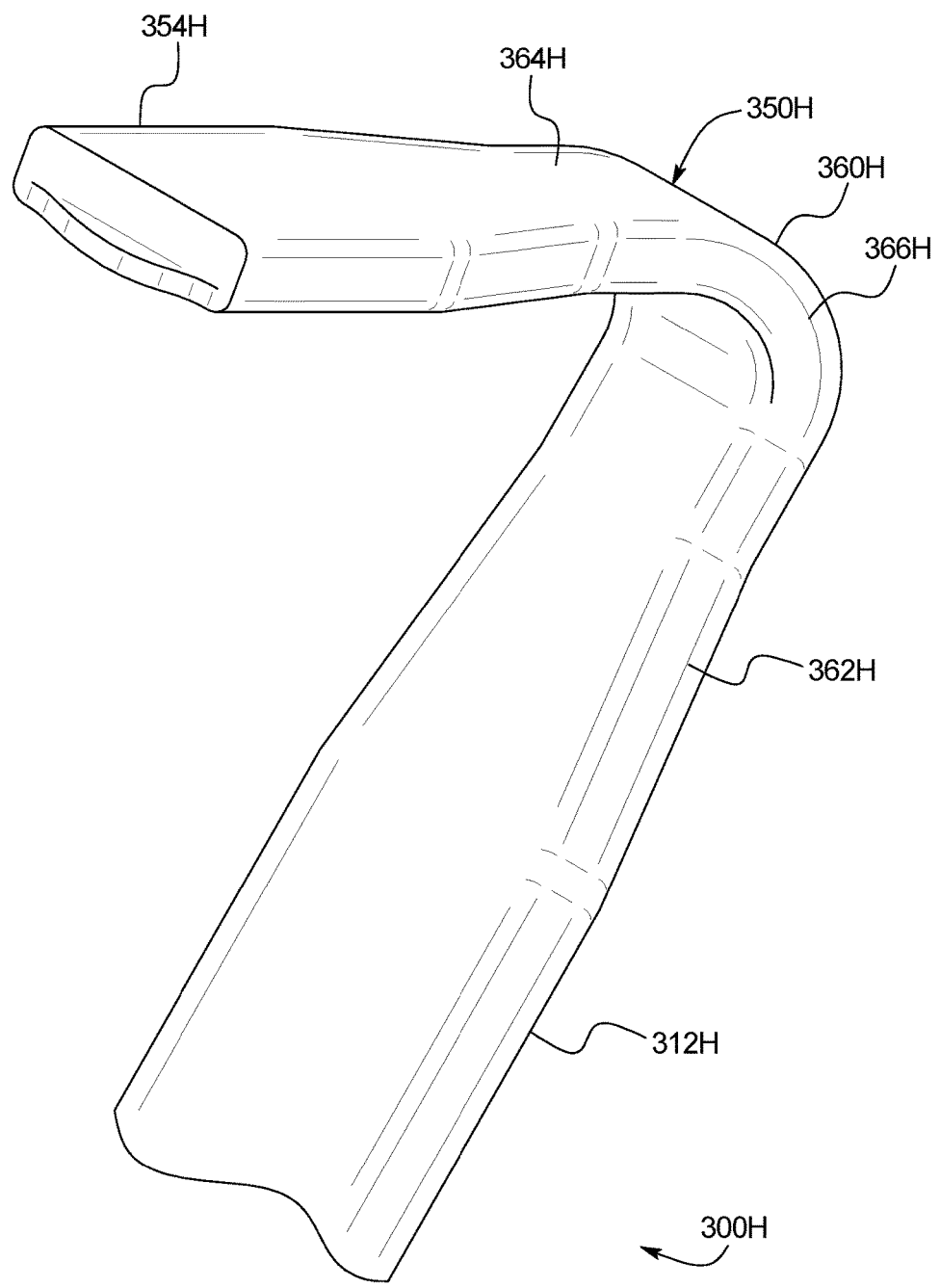
FIG. 22 is an enlarged fragmentary front view of an upper portion of the brake shoe key of FIG. 14.
Figure 23:
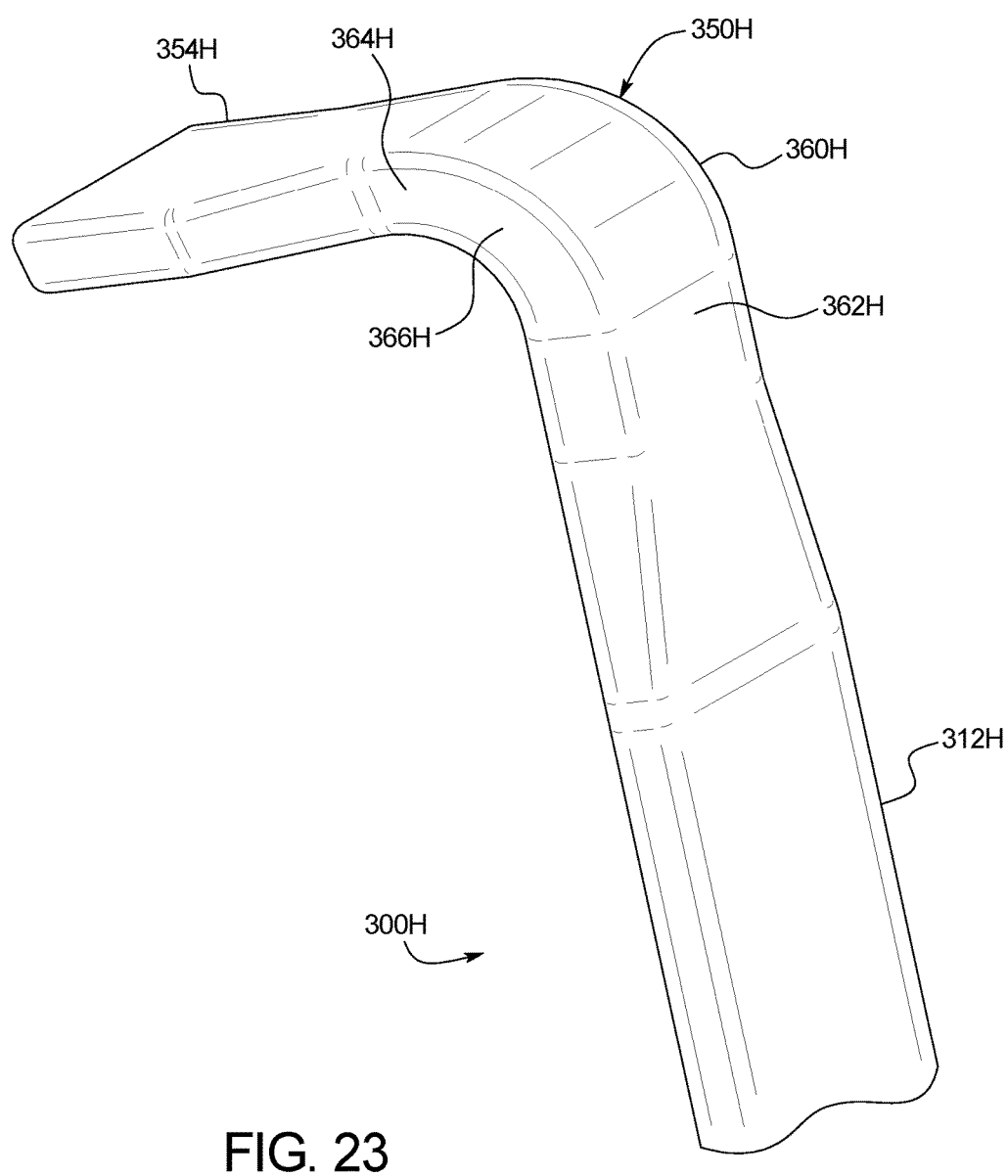
FIG. 23 is an enlarged fragmentary rear view of an upper portion of the brake shoe key of FIG. 14.

FIGS. 8C, 9C, and 10C illustrate another example of the brake shoe key of the present disclosure where the head 350E has a fully tapered width that has a first width in W-XA that is approximately ¾ inches and tapers to a second narrower width W-XZ that is approximately ¼ inch, but the same length and height as head 350A. By making the stop leg 354E fully tapered, the stop leg 354E and thus the head 350E has less mass and is thus subject to less weakening.

In other example embodiments, one or more holes, slots, cutouts, or openings (not shown) are formed in the stop leg of the brake shoe key of the present disclosure to reduce mass of the head. In further example embodiments, the mass of the corner or corner section of the head may also be reduced.

Turning now to FIGS. 11A, 11B, 11C, 12A, 12B, 12C, 13A, 13B, and 13C, two further examples embodiments of the present disclosure having an alternative configuration head are generally illustrated in FIGS. 11B, 11C, 12B, 12C, 13B, and 13C.

FIGS. 11A, 12A, and 13A illustrate a known brake shoe key where the head 350A has a uniform corner configuration, and specifically a corner or corner section 360A with a uniform thickness or height H that is approximately ³⁄₁₆ inches, a uniform length L that is approximately 2 inches, and a uniform width W that is approximately ¾ inches.

FIGS. 11B, 12B, and 12B illustrate one example of the brake shoe key of the present disclosure where the head 350F has an alternative corner or corner section configuration, and specifically a corner or corner section 360F with a non-uniform thickness that is approximately ¼ inch (at its thickest area or cross section), a length that is approximately 2 inches, and a non-uniform width that is hourglass shaped and approximately ⅝ inches (at its thinnest area or cross section). By making the corner 360B with this alternative configuration, the head 350F is subject to less weakening.

FIGS. 11C, 12C, and 13C illustrate another example of the brake shoe key of the present disclosure where the head 350G has an alternative corner or corner section configuration, and specifically a corner or corner section 360G with a non-uniform thickness or height that is approximately ⁵⁄₁₆ inches (at its thickest area or cross section), a length that is approximately 2 inches, and a non-uniform width that is hourglass shaped and approximately ½ inch (at its thinnest area or cross section). By making the corner 360B with this alternative configuration, the head 350G is subject to less weakening.

It should be appreciated that increasing the cross-section's moment of inertia decreases the stress that would be caused by a given amount of force or vibrational input. Thus, in these example embodiments, the width is generally narrowed and the thickness is generally increased to provide more strength to the corner or corner section of the head.

Turning now to FIGS. 14, 15, 16, 17, 18, 19, 20, 21, 22, and 23, another further example embodiment of the present disclosure having an alternative configured head is generally shown.

In this alternative example embodiment of the brake shoe key of the present disclosure, the head 350H has an alternative corner or corner section configuration, and specifically a corner or corner section 360H with portions or areas that have a non-uniform thickness and a non-uniform width. In this illustrated example embodiment, the width that has a generally hourglass shape. Like the embodiments of FIGS. 11B and 11C described above, by making the corner or corner section 360H with this alternative configuration, the head 350H is stronger and subject to less weakening. More specifically, the width is narrowed and the thickness is increased to provide more strength to the corner or corner section of this head. As indicated above, increasing the cross-section's moment of inertia decreases the stress that would be caused by a given amount of force or vibrational input.

More specifically, this illustrated example brake shoe key 300H has a body or shank 310H including a first generally straight section 312H integrally connected to the head 350H at one end. The straight section 312H is not formed with a stiffening groove in this illustrated example embodiment, but may include one or more stiffening grooves in other embodiments. The body or shank 310H further includes a first arcuate section 316H integrally connected to the end of the straight section 312H opposite the head 350H. The body or shank 310H further includes a second generally straight section 318H integrally connected to the first arcuate section 316H at one end and integrally connected to an offset notch 322H at the opposite end. The body or shank 310H further includes a second somewhat bowed or arcuate section 326H integrally connected to the notch 322H at one end and integrally connected to a tapered locking section 328H at the opposite end. The opposing faces of the tapered locking section 328H at the bottom of the body or shank 310H are formed with serrations or a series of sinuous bends that provide a plurality of end notches engageable with an adjacent end edge of the brake head when assembled. Thus, it should be appreciated that the body or shank 310H is generally curved or arched to provide a spring or biasing effect. The head 350H of brake shoe key 300H includes a stop leg 354H that extends transversely from the body or shank 310H at an acute angle (i.e., generally less than 90 degrees) such as at an angle of approximately 82 degrees. The head 350H of brake shoe key 300H further includes a corner or corner section 360H that is integrally connected to the stop leg 354H and integrally connected to the first straight section 312H as further described below.

The corner or corner section 360H in this illustrated example embodiment includes: (a) a first portion or area 362H integrally connected to the first generally straight section 312H; (b) a second portion or area 364H integrally connected to the stop leg 354H; and (c) a third portion or area 366H integrally connected to each of (and connecting each of) the first portion or area 362H and the second portion or area 364H.

The first portion or area 362H has a non-uniform gradually increasing thickness from the first generally straight section 312H to the third portion or area 366H in this illustrated example embodiment. Said differently, the first portion or area 362H has a non-uniform gradually decreasing thickness from the third portion or area 366H to the generally straight section 312H in this illustrated example embodiment. Each of the thicknesses of first portion or area 362H is greater than the thickness of the first generally straight section 312H, of the other portions or areas of the body 310H, and of the stop leg 354H in this illustrated example embodiment. It should be appreciated that in this embodiment and the other embodiments disclosed herein, the thickness is measured from the front or inner surface to the rear or outer surface. It should also be appreciated that in this illustrated example embodiment, the body (including the first generally straight section 312H) has a 3/16 inch thickness. It should also be appreciated that in this illustrated example embodiment, the stop leg 354H has a 3/16 inch thickness.

The first portion or area 362H has a non-uniform gradually decreasing width from the first generally straight section 312H to the third portion or area 366H in this illustrated example embodiment. Said differently, the first portion or area 362H has a non-uniform gradually increasing width from the third portion or area 366H to the generally straight section 312H in this illustrated example embodiment. Each of the widths of first portion or area 362H is less than the width of the first generally straight section 312H, of the other portions or areas of the body 310H, and of the stop leg 354H in this illustrated example embodiment. It should be appreciated that in this embodiment and the other embodiments disclosed herein, the width is measured from the left side surface to the right side surface. It should also be appreciated that in this illustrated example embodiment, the body (including the first generally straight section 312H) has a 3/4 inch width. It should also be appreciated that in this illustrated example embodiment, the stop leg 354H has a 3/4 inch width.

The second portion or area 364H has a non-uniform gradually increasing thickness from the stop leg 354H to the third portion or area 366H in this illustrated example embodiment. Said differently, the second portion or area 364H has a non-uniform gradually decreasing thickness from the third portion or area 366H to the stop leg 354H in this illustrated example embodiment. Each of the thicknesses of second portion or area 364H is greater than the thickness of the first generally straight section 312H, of the other portions or areas of the body 310H, and of the stop leg 354H in this illustrated example embodiment.

The second portion or area 364H has a non-uniform gradually decreasing width from the stop leg 354H to the third portion or area 366H in this illustrated example embodiment. Said differently, the second portion or area 364H has a non-uniform gradually increasing width from the third portion or area 366H to the stop leg 354H in this illustrated example embodiment. Each of the widths of second portion or area 364H is less than the width of the first generally straight section 312H, of the other portions or areas of the body 310H, and of the stop leg 354H in this illustrated example embodiment.

The third portion or area 366H which connects the first portion or area 362H to the second portion or area 364H has a constant thickness from the first portion or area 362H to the second portion or area 364H in this illustrated example embodiment.

The third portion or area 366H has a constant width from the first portion or area 362H to the second portion or area 364H in this illustrated example embodiment.

It should be appreciated that in other embodiments, part of the third portion or area 366H extending from the first portion or area 362H can have an increasing thickness and a decreasing width. It should also be appreciated that in other embodiments, part of the third portion or area 366H extending from the stop leg 354H can have an increasing thickness and a decreasing width.

In this illustrated example embodiment, the second portion or area 364H at least partially extends at a transverse angle to and specifically at an acute angle to the first portion or area 362H. In this illustrated example embodiment, the first portion or area 362H, the second portion or area 364H, and the third portion or area 366H provide the transition, radius, curvature, or change of direction from the first portion or area 362H to the third portion or area 366H. In other embodiments, the third portion or area 366H provides the transition, radius, curvature, or change of direction from the first portion or area 362H to the third portion or area 366H. In other embodiments, the first portion or area 362H and the third portion or area 366H provide the transition, radius, curvature, or change of direction from the first portion or area 362H to the third portion or area 366H. In other embodiments, the second portion or area 364H and the third portion or area 366H provide the transition, radius, curvature, or change of direction from the first portion or area 362H to the third portion or area 366H.

In this illustrated example embodiment, the first portion or area 362H, the second portion or area 364H, and the third portion or area 366H have a generally hourglass shape or width.

In this illustrated example embodiment, the first portion or area 362H, the second portion or area 364H, and the third portion or area 366H have a slightly concave front or inner surface. In certain embodiments, this transverse curvature along the width of the key is formed during the post forging bending process which forms the corner or corner section 360H discussed below.

In this illustrated example embodiment, the first portion or area 362H, the second portion or area 364H, and the third portion or area 366H have a slightly convex rear or outer surface. In certain embodiments, this transverse curvature along the width of the key is formed during the post forging bending process which forms the corner or corner section 360H discussed below.

In this illustrated example embodiment, the stop leg 354H includes an outwardly extending lip. This lip is formed during the forging process described below. In other embodiments, the stop leg does not include this lip.

In various embodiments, this brake shoe key 300H is made by suitably forging the body 310H and the head 350H from a round steel rod or stock (not shown), and then bending the head 350H to form the corner or corner section. In various embodiments, the round steel rod or stock has a 7/16 inch diameter. It should be appreciated that the forging process will include a plurality of dies and sequential impressions that flatten the round steel rod or stock to produce the minor curved features and to provide for the different thicknesses of the corner or corner section 360H. It should be appreciated that the manufacturing process will further include bending the rod or stock to produce the curvature of the corner or corner section 360H.

In other embodiments, the corner of the brake shoe key undergoes a shot-peening process. This reduces any surface micro-cracking that may be present and induces a state of compression in the skin-layer of metal that counteracts the strain due to bending.

It should be appreciated from the above, that in various embodiments, the railroad car brake shoe key of the present disclosure thus includes a body including: (a) a first generally straight section formed with a strengthening groove, (b) a first arcuate section integrally connected to the first generally straight section, (c) a second generally straight section integrally connected to the first arcuate section, (d) an offset notch integrally connected to the second generally straight section, (e) a second arcuate section integrally connected to the offset notch, and (f) a tapered locking section integrally connected to the second arcuate section, the tapered locking section formed with a series of sinuous bends that provide a plurality of end notches engageable with an adjacent end edge of a brake head; and a head including: (a) a corner section integrally connected to the first generally straight section, and (b) a reduced mass stop leg integrally connected to the straight section.

It should also be appreciated from the above, that in various embodiments, the railroad car brake shoe key of the present disclosure thus includes a body including: (a) a first generally straight section formed with a strengthening groove, (b) a first arcuate section integrally connected to the first generally straight section, (c) a second generally straight section integrally connected to the first arcuate section, (d) an offset notch integrally connected to the second generally straight section, (e) a second arcuate section integrally connected to the offset notch, and (f) a tapered locking section integrally connected to the second arcuate section, the tapered locking section formed with a series of sinuous bends that provide a plurality of end notches engageable with an adjacent end edge of a brake head; and a head including: (a) a corner section integrally connected to the first generally straight section, the corner section having one or more portions with thicknesses greater than the thickness of the body or parts thereof, and (b) a stop leg integrally connected to the straight section.

It should further be appreciated that two or more different mass reducing features, alternative configurations, or surface treatments of the present disclosure can be combined in various alternative embodiments of the present disclosure.

It should further be appreciated that one or more of the multiple different mass reducing features or alternative configurations of the stop leg of the present disclosure can be combined with one or more of the corner alternative configurations in various alternative embodiments of the present disclosure.

It should further be appreciated that the head reducing features and alternative configurations can be employed in any suitable spring type brake shoe key and with other suitable enhancements or changes to known brake shoe keys.

It will be understood that modifications and variations may be effected without departing from the scope of the novel concepts of the present invention, and it is understood that this application is to be limited only by the scope of the claims.

The invention is claimed as follows:

1. A railroad car brake shoe key comprising:
   a body including:
   (a) a first generally straight section,
   (b) a first arcuate section integrally connected to the first generally straight section,
   (c) a second generally straight section integrally connected to the first arcuate section,
   (d) an offset notch integrally connected to the second generally straight section,
   (e) a second arcuate section integrally connected to the offset notch, and
   (f) a tapered locking section integrally connected to the second arcuate section, the tapered locking section formed with a series of sinuous bends that provide a plurality of end notches engageable with an adjacent end edge of a brake head; and
   a head including:
   a corner section integrally connected to the first generally straight section, the corner section having a first area with a thickness greater than the thickness of the first generally straight section, and the corner section having a width that is hourglass shaped, and
   a stop leg integrally connected to the corner section.

2. The railroad car brake shoe key of claim 1, wherein the first generally straight section is formed with a strengthening groove.

3. The railroad car brake shoe key of claim 1, wherein the width of the first area of the corner section is less than the width of the first generally straight section.

4. The railroad car brake shoe key of claim 3, wherein the first area of the corner section has a thickness that is approximately ¼ inch and a width that is approximately ⅝ inches.

5. The railroad car brake shoe key of claim 1, wherein the corner section has a non-uniform thickness.

6. The railroad car brake shoe key of claim 1, wherein the first area has a slightly concave inner surface.

7. The railroad car brake shoe key of claim 1, wherein the first area has a slightly convex outer surface.

8. A railroad car brake shoe key comprising:
   a body including:
   (a) a first generally straight section,
   (b) a first arcuate section integrally connected to the first generally straight section,
   (c) a second generally straight section integrally connected to the first arcuate section,
   (d) an offset notch integrally connected to the second generally straight section,
   (e) a second arcuate section integrally connected to the offset notch, and
   (f) a tapered locking section integrally connected to the second arcuate section, the tapered locking section formed with a series of sinuous bends that provide a plurality of end notches engageable with an adjacent end edge of a brake head; and
   a head including:
   a corner section integrally connected to the first generally straight section, the corner section having a plurality of areas each having different thicknesses and wherein said thicknesses are greater than the thickness of the first generally straight section, and the corner section having a width that is hourglass shaped, and
   a stop leg integrally connected to the corner section.

9. The railroad car brake shoe key of claim 8, wherein the first generally straight section is formed with a strengthening groove.

10. The railroad car brake shoe key of claim 8, wherein the widths of the plurality of areas of the corner section are each less than the width of the first generally straight section.

11. The railroad car brake shoe key of claim 8, wherein the plurality of areas each has a slightly concave inner surface.

12. The railroad car brake shoe key of claim 8, wherein the plurality of areas each has a slightly convex outer surface.

13. A railroad car brake shoe key comprising:
a body including:
(a) a first generally straight section,
(b) a first arcuate section integrally connected to the first generally straight section,
(c) a second generally straight section integrally connected to the first arcuate section,
(d) an offset notch integrally connected to the second generally straight section,
(e) a second arcuate section integrally connected to the offset notch, and
(f) a tapered locking section integrally connected to the second arcuate section, the tapered locking section formed with a series of sinuous bends that provide a plurality of end notches engageable with an adjacent end edge of a brake head; and
a head including:
a stop leg, and
a corner section integrally connected to the first generally straight section and the stop leg, the corner section having: (i) a first area with gradually increasing thicknesses that are each greater than the thickness of the first generally straight section; and (ii) a second area with gradually increasing thicknesses that are each greater than the thickness of the stop leg, wherein the first area has gradually decreasing widths that are less than the width of the first generally straight section, and wherein the second area has gradually decreasing widths that are each less than the width of the stop leg.

14. The railroad car brake shoe key of claim 13, wherein the first generally straight section is formed with a strengthening groove.

15. The railroad car brake shoe key of claim 13, wherein the first area and the second area each has a slightly concave inner surface.

16. The railroad car brake shoe key of claim 13, wherein the first area and the second area each has a slightly convex outer surface.

17. A railroad car brake shoe key comprising:
a body including:
(a) a first generally straight section,
(b) a first arcuate section integrally connected to the first generally straight section,
(c) a second generally straight section integrally connected to the first arcuate section,
(d) an offset notch integrally connected to the second generally straight section,
(e) a second arcuate section integrally connected to the offset notch, and
(f) a tapered locking section integrally connected to the second arcuate section, the tapered locking section formed with a series of sinuous bends that provide a plurality of end notches engageable with an adjacent end edge of a brake head; and
a head including:
a stop leg; and
a corner section including:
(i) a first portion integrally connected to the first generally straight section;
(ii) a second portion integrally connected to the stop leg; and
(iii) a third portion integrally connected to each of the first portion and the second portion,
wherein first portion has a non-uniform gradually increasing thickness from the first generally straight section to the third portion,
wherein the second portion has a non-uniform gradually increasing thickness from the stop leg to the third portion, and
wherein the second portion has a non-uniform gradually decreasing width from the stop leg to the third portion.

18. The railroad car brake shoe key of claim 17, wherein the first generally straight section is formed with a strengthening groove.

19. The railroad car brake shoe key of claim 17, wherein the first portion has a non-uniform gradually decreasing width from the first generally straight section to the third portion.

20. The railroad car brake shoe key of claim 17, wherein the third portion has a constant thickness from the first portion to the second portion.

21. The railroad car brake shoe key of claim 20, wherein the third portion has a constant width from the first portion to the second portion.

22. The railroad car brake shoe key of claim 17, wherein the second portion extends at an acute angle to the first portion.

23. The railroad car brake shoe key of claim 17, wherein the first portion, the second portion, and the third portion each has a slightly concave inner surface.

24. The railroad car brake shoe key of claim 17, wherein the first portion, the second portion, and the third portion each has a slightly convex outer surface.

25. A railroad car brake shoe key comprising:
a body including:
(a) a first generally straight section,
(b) a first arcuate section integrally connected to the first generally straight section,
(c) a second generally straight section integrally connected to the first arcuate section,
(d) an offset notch integrally connected to the second generally straight section,
(e) a second arcuate section integrally connected to the offset notch, and
(f) a tapered locking section integrally connected to the second arcuate section, the tapered locking section formed with a series of sinuous bends that provide a plurality of end notches engageable with an adjacent end edge of a brake head; and
a head including:
a stop leg; and
a corner section including:
(i) a first portion integrally connected to the first generally straight section;
(ii) a second portion integrally connected to the stop leg; and
(iii) a third portion integrally connected to each of the first portion and the second portion,
wherein first portion has a non-uniform gradually increasing thickness from the first generally straight section to the third portion,
wherein the second portion has a non-uniform gradually increasing thickness from the stop leg to the third portion, and
wherein the first portion, the second portion, and the third portion each has a slightly concave inner surface.

* * * * *